(12) United States Patent
Moody

(10) Patent No.: US 9,017,159 B2
(45) Date of Patent: *Apr. 28, 2015

(54) CASINO GAME WITH PAY LINE MULTIPLIERS

(75) Inventor: Ernest W Moody, Las Vegas, NV (US)

(73) Assignee: IGT, Las Vegas, NV (US)

( * ) Notice: Subject to any disclaimer, the term of this patent is extended or adjusted under 35 U.S.C. 154(b) by 230 days.

This patent is subject to a terminal disclaimer.

(21) Appl. No.: 13/442,058

(22) Filed: Apr. 9, 2012

(65) Prior Publication Data

US 2012/0196666 A1    Aug. 2, 2012

Related U.S. Application Data

(63) Continuation of application No. 11/923,221, filed on Oct. 24, 2007, now Pat. No. 8,152,616.

(51) Int. Cl.
| | |
|---|---|
| *A63F 9/24* | (2006.01) |
| *A63F 13/00* | (2014.01) |
| *G07F 17/32* | (2006.01) |
| *A63F 1/00* | (2006.01) |

(52) U.S. Cl.
CPC .............. *A63F 13/005* (2013.01); *G07F 17/32* (2013.01); *G07F 17/3244* (2013.01); *A63F 1/00* (2013.01)

(58) Field of Classification Search
USPC .......................................... 463/13, 16, 20, 25
See application file for complete search history.

(56) References Cited

U.S. PATENT DOCUMENTS

| | | |
|---|---|---|
| 5,167,413 A | 12/1992 | Fulton |
| 5,251,897 A | 10/1993 | Fulton |
| 5,322,295 A | 6/1994 | Cabot et al. |
| 5,374,067 A | 12/1994 | Jones |
| 5,411,257 A | 5/1995 | Fulton |
| 5,431,408 A | 7/1995 | Adams |
| 5,437,451 A | 8/1995 | Fulton |
| 5,531,448 A | 7/1996 | Moody |
| 5,636,842 A | 6/1997 | Cabot et al. |
| 5,732,950 A | 3/1998 | Moody |
| 5,755,621 A | 5/1998 | Marks et al. |
| 5,803,809 A | 9/1998 | Yoseloff |
| 5,820,460 A | 10/1998 | Fulton |
| 5,823,873 A | 10/1998 | Moody |
| 5,833,536 A | 11/1998 | Davids et al. |
| 5,833,537 A | 11/1998 | Barrie |
| 5,873,823 A | 2/1999 | Eidelberg et al. |
| 5,882,259 A | 3/1999 | Holmes, Jr. et al. |
| 5,911,418 A | 6/1999 | Adams |
| 5,954,335 A | 9/1999 | Moody |
| 5,957,774 A | 9/1999 | Holmes, Jr. et al. |
| 6,007,066 A | 12/1999 | Moody |
| 6,050,658 A | 4/2000 | O'Sullivan et al. |
| 6,062,979 A | 5/2000 | Inoue |
| 6,098,985 A | 8/2000 | Moody |

(Continued)

*Primary Examiner* — Omkar Deodhar
(74) *Attorney, Agent, or Firm* — Neal, Gerber & Eisenberg LLP

(57) ABSTRACT

A pay line multiplier is randomly selected for each active pay line. The pay line multiplier varies for each round of play. An extra wager may be required from the player to activate this feature during the play of a casino game. A player makes a wager to activate at least two pay lines to be played in the casino game. For each active pay line, a multiplier is randomly selected from a group of various multipliers and the selected multiplier is assigned to the activated pay line. The casino game is then played to achieve an outcome on each pay line. Each pay line that has a winning outcome has any associated award increased by the multiplier for that pay line.

6 Claims, 3 Drawing Sheets

(56) References Cited

U.S. PATENT DOCUMENTS

| | | |
|---|---|---|
| 6,120,378 A | 9/2000 | Moody et al. |
| 6,149,521 A | 11/2000 | Sanduski |
| 6,176,781 B1 | 1/2001 | Walker et al. |
| 6,179,711 B1 | 1/2001 | Yoseloff |
| 6,193,235 B1 | 2/2001 | Vancura et al. |
| 6,196,547 B1 | 3/2001 | Pascal et al. |
| 6,213,877 B1 | 4/2001 | Walker et al. |
| 6,248,016 B1 | 6/2001 | Walker et al. |
| 6,257,979 B1 | 7/2001 | Walker et al. |
| 6,311,978 B1 | 11/2001 | Moody |
| 6,328,649 B1 | 12/2001 | Randall et al. |
| 6,334,613 B1 | 1/2002 | Yoseloff |
| 6,406,023 B1 | 6/2002 | Rowe |
| 6,419,578 B1 | 7/2002 | Moody et al. |
| 6,422,940 B1 | 7/2002 | Walker et al. |
| 6,474,645 B2 | 11/2002 | Tarantino |
| 6,517,074 B1 | 2/2003 | Moody et al. |
| 6,523,829 B1 | 2/2003 | Walker et al. |
| 6,561,898 B2 | 5/2003 | Moody |
| 6,561,904 B2 | 5/2003 | Locke et al. |
| 6,568,680 B1 | 5/2003 | Moody et al. |
| 6,569,013 B1 | 5/2003 | Taylor |
| 6,612,927 B1 | 9/2003 | Slomiany et al. |
| 6,652,377 B1 | 11/2003 | Moody |
| 6,672,959 B2 | 1/2004 | Moody et al. |
| 6,726,427 B2 | 4/2004 | Jarvis et al. |
| 6,729,961 B1 | 5/2004 | Millerschone |
| 6,916,245 B1 | 7/2005 | Vancura et al. |
| 6,935,950 B2 | 8/2005 | Tarantino |
| 6,955,356 B2 | 10/2005 | Moody |
| 6,964,418 B2 | 11/2005 | Moody |
| 6,991,538 B2 | 1/2006 | Cannon |
| 6,994,624 B2 | 2/2006 | Gold et al. |
| 7,056,207 B2 | 6/2006 | Walker et al. |
| 7,059,965 B2 | 6/2006 | Jackson |
| 7,137,628 B2 | 11/2006 | Moody |
| 7,156,397 B2 | 1/2007 | Moody et al. |
| 7,156,734 B1 | 1/2007 | Walker et al. |
| 7,201,655 B2 | 4/2007 | Walker et al. |
| 7,222,857 B2 | 5/2007 | Moody |
| 7,222,858 B2 | 5/2007 | Moody |
| 7,247,092 B2 | 7/2007 | Jarvis et al. |
| 7,250,001 B2 | 7/2007 | Baerlocher et al. |
| 7,258,611 B2 | 8/2007 | Bigelow, Jr. et al. |
| 7,297,057 B2 | 11/2007 | Gerrard et al. |
| 7,306,518 B2 | 12/2007 | Hughs-Baird et al. |
| 7,331,863 B2 | 2/2008 | Baerlocher |
| 7,338,370 B2 | 3/2008 | Oles et al. |
| 7,354,344 B2 | 4/2008 | Paulsen et al. |
| 7,404,762 B2 | 7/2008 | Moody |
| 7,416,186 B2 | 8/2008 | Walker et al. |
| 7,419,162 B2 | 9/2008 | Lancaster et al. |
| 7,431,644 B2 | 10/2008 | Moody |
| 7,488,251 B2 | 2/2009 | Kaminkow |
| 7,524,243 B2 | 4/2009 | Bansemer et al. |
| 7,566,271 B2 | 7/2009 | Hostetler et al. |
| 7,614,946 B2 | 11/2009 | Nicely |
| 7,641,197 B2 | 1/2010 | Jackson |
| 7,658,672 B1 | 2/2010 | Wolf et al. |
| 7,748,714 B2 | 7/2010 | Nicely et al. |
| 7,749,059 B2 | 7/2010 | Tarantino |
| 7,771,274 B2 | 8/2010 | Walker et al. |
| 7,785,188 B2 | 8/2010 | Cannon |
| 7,803,041 B2 | 9/2010 | Gold et al. |
| 7,803,043 B2 | 9/2010 | Jackson |
| 7,815,500 B2 | 10/2010 | Montross et al. |
| 7,819,740 B2 | 10/2010 | Masci et al. |
| 7,837,545 B2 | 11/2010 | Blair, Jr. et al. |
| 7,857,693 B1 | 12/2010 | Johnson et al. |
| 7,867,073 B2 | 1/2011 | Walker et al. |
| 7,914,369 B2 | 3/2011 | Walker et al. |
| 7,918,724 B2 | 4/2011 | Walker et al. |
| 7,922,575 B2 | 4/2011 | Jankowski |
| 8,029,358 B2 | 10/2011 | Bigelow, Jr. et al. |
| 8,062,119 B2 | 11/2011 | Stern et al. |
| 8,083,578 B2 | 12/2011 | Jackson |
| 8,092,290 B2 | 1/2012 | Darby |
| 8,118,662 B2 | 2/2012 | Caputo et al. |
| 8,137,174 B2 | 3/2012 | Nicely et al. |
| 8,177,620 B2 | 5/2012 | Miles et al. |
| 8,235,780 B2 | 8/2012 | Nicely |
| 8,235,781 B2 | 8/2012 | Moody |
| 8,235,801 B2 * | 8/2012 | Tan .................................. 463/25 |
| 8,262,448 B2 | 9/2012 | Nicely et al. |
| 8,262,455 B2 | 9/2012 | Caputo et al. |
| 8,272,940 B2 | 9/2012 | Cuddy et al. |
| 8,353,751 B2 | 1/2013 | Bickley et al. |
| 8,408,984 B2 | 4/2013 | Walker et al. |
| 8,434,764 B2 | 5/2013 | Walker et al. |
| 8,444,465 B2 | 5/2013 | Macaulay |
| 8,449,362 B2 | 5/2013 | Jackson |
| 8,460,094 B2 | 6/2013 | Bigelow, Jr. et al. |
| 2003/0216165 A1 * | 11/2003 | Singer et al. .................... 463/20 |
| 2004/0152498 A1 | 8/2004 | Kaminkow et al. |
| 2005/0170876 A1 | 8/2005 | Masci et al. |
| 2006/0068884 A1 | 3/2006 | Baerlocher et al. |
| 2008/0111309 A1 | 5/2008 | Nicely et al. |
| 2009/0124326 A1 | 5/2009 | Caputo et al. |
| 2010/0004051 A1 | 1/2010 | Walker et al. |
| 2011/0014963 A1 | 1/2011 | Walker et al. |
| 2012/0129589 A1 | 5/2012 | Caputo et al. |

* cited by examiner

CASINO GAME WITH PAY LINE MULTIPLIERS

CROSS-REFERENCE TO RELATED APPLICATION

This application is a Continuation of application Ser. No. 11/923,221, filed Oct. 24, 2007, now U.S. Pat. No. 8,152,616, issued Apr. 10, 2012.

BACKGROUND OF THE INVENTION

This invention relates primarily to casino games, and more particularly to casino games such as video poker and slot machines. The present invention uses a randomly determined multiplier feature which is applied to each pay line of the casino game.

There are numerous casino games that utilize pay lines which designate the grouping of symbols that must form a winning combination in order for a player to receive a payout for his wager. One casino game that uses multiple pay lines is multiple hand video poker.

Conventional video draw poker is a single player game in which the player does not play against a dealer or other players, but rather merely tries to achieve the highest possible ranking poker hand.

After an initial deal of five cards, the player is allowed to discard and replace unwanted cards with replacement cards. Electronic video poker games use poker hand rankings to determine winning combinations and a payout schedule is used to determine the amount awarded to the player for achieving a winning combination.

The conventional winning poker hand rankings that are used in video poker in order from highest to lowest are: Royal Flush, Straight Flush, Four of a Kind, Full House, Flush, Straight, Three of a Kind, Two Pair and a Pair of Jacks or better. Any hand having less than a Pair of Jacks or better is a losing hand. These winning poker hand rankings are used in the Jacks or Better draw poker format as well as many of the other draw poker formats.

Video poker as a draw poker game using the Jacks or Better draw poker format has been played in gaming casinos for many years. Variations of video draw poker have evolved and include video draw poker using Jokers as wild cards and video draw poker using Deuces (or even Sevens) as wild cards. Another known variation of video draw poker is the Tens or Better format in which the lowest winning hand combination is a Pair of Tens. Most of the more recent modifications to video involve the use of different draw poker formats such as Bonus Poker, Double Bonus Poker, Double-Double Bonus Poker and even Triple Bonus Poker. Different draw poker formats involve changes to the pay table and often involve using different poker hand rankings as winning hand combinations.

Multiple hand video poker games allow the player to play more than one hand of video poker at a time. U.S. Pat. No. 5,823,873 to Moody, the disclosure of which is incorporated herein by reference, discloses a multiple hand poker game in which the player plays two or more hands of video poker at a time. An initial starting hand is dealt, the player discards unwanted cards and replacement cards are dealt for the discarded cards. The poker hand ranking of the final cards is determined and the player receives a payout for any winning card combination achieved. Each hand of the multiple hand poker game is treated as a separate pay line for payout purposes. However, each pay line uses the same pay table for the purpose of determining the amount received by the player for winning hands.

U.S. Pat. No. 6,149,521 to Sanduski, the disclosure of which is incorporated herein by reference, discloses randomly applying a multiplier to a pay line based on the value of a multiplier card. Sanduski discloses using only a single multiplier value for a single hand of video poker. For example, when a player achieves a Four-of-a-Kind, the payout for this winning combination is multiplied by the value of the kicker card in the poker hand.

U.S. Pat. No. 7,247,092 to Jarvis et al., the disclosure of which is incorporated herein by reference, discloses the use of one or more multiplier cards added to a conventional deck of playing cards. Whenever a multiplier card appears during the play of a video poker game, the payout for any winning combination that is achieved is multiplier by the value of the multiplier card. This Jarvis feature has been commercialized in a game known as SUPER TIME PAY which is marketed by IGT of Reno, Nev.

The Jarvis multiplier card feature has been applied to multiple hand video poker. For example, in TRIPLE PLAY SUPER TIME PAY all pay lines are eligible for the same multiplier value should a multiplier card appear in the initial deal of the starting hand.

Slot machines also have one or more pay lines and for each pay line that has been activated by making a wager thereon, a player receives a payout whenever a winning symbol combination that appears on an active pay line.

U.S. Pat. No. 6,120,378 to Moody, the disclosure of which is incorporated herein by reference, discloses a multiple reel slot machine with multiple pay lines. The player makes a wager for each pay line that the player wishes to have activated for a particular round of play. The method of the present invention may be practiced using the slot machine disclosed in this '378 patent as well as other slot machines which have multiple pay lines.

The present invention provides a method for applying separate multipliers to each pay line thereby adding a new and exciting wagering and winning feature for the player.

SUMMARY OF THE INVENTION

A pay line multiplier is randomly selected for each active pay line. The pay line multiplier varies for each round of play. An extra wager may be required from the player to activate this feature during the play of a casino game.

A player makes a wager to activate at least two pay lines to be played in the casino game. For each active pay line, a multiplier is randomly selected a multiplier from a group of various multipliers and the selected multiplier is assigned to the activated pay line. The casino game is then played to achieve an outcome on each pay line. Each pay line that has a winning outcome has any associated award increased by the multiplier for that pay line.

DETAILED DESCRIPTION OF THE PREFERRED EMBODIMENTS

The present invention relates to casino games such as video poker games and slot machines.

Figure 1:
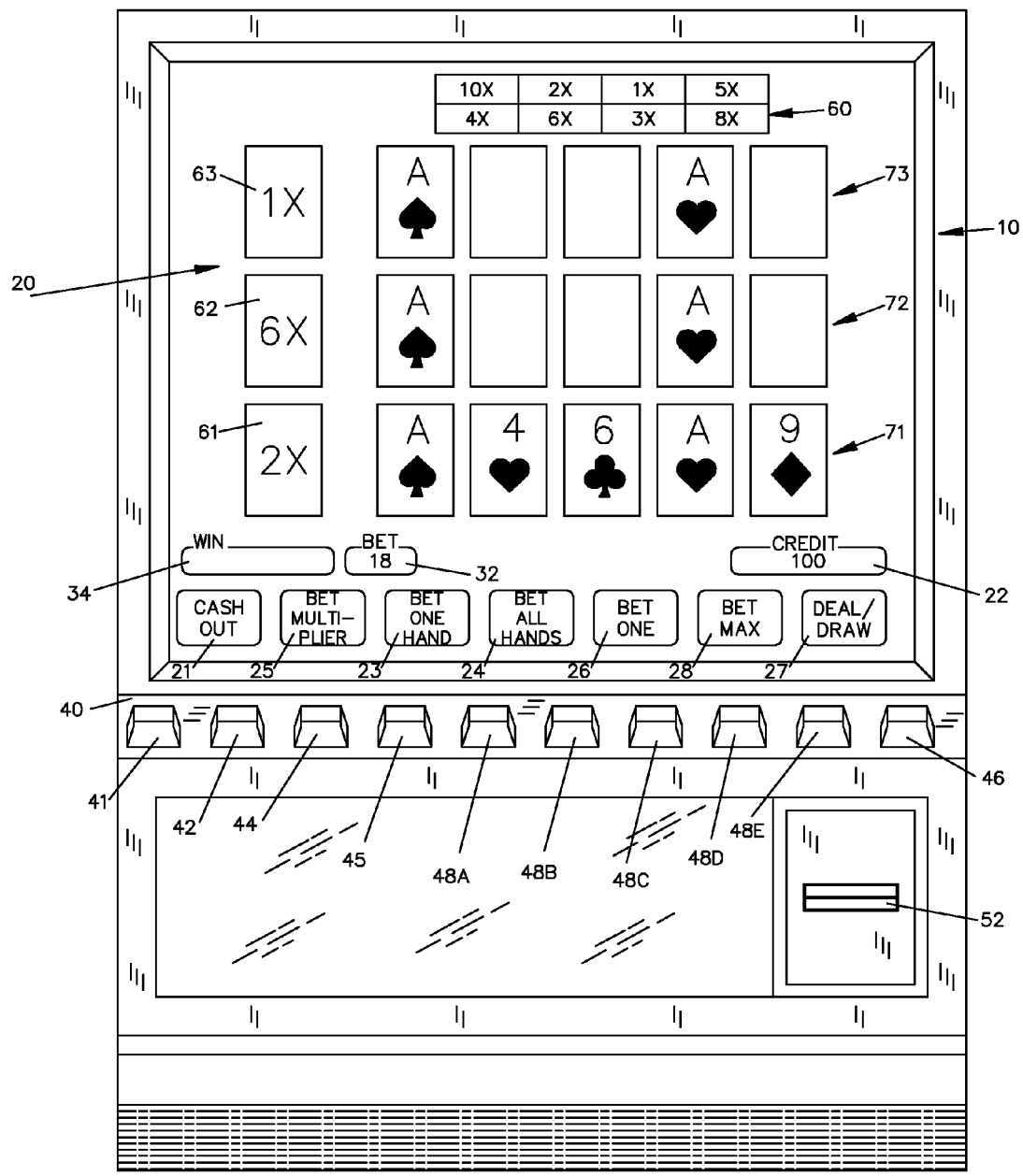
FIG. 1 shows a video poker machine configured to practice the present invention showing a representative initial deal of the cards of a multiple hand poker game.

FIG. 1 shows generally at 10 a typical electronic video poker machine that is configured to provide to the player the method of the present invention. A portion of the poker machine 10 includes a conventional video screen display 20 upon which the play of the poker game is shown.

The poker machine 10 also includes a conventional currency/ticket acceptor 52 by which the player can insert currency or tickets to add credits to a credit meter 22. It is also possible to provide a conventional coin head (not shown) to allow the player to add credits or make wagers by using coins or gaming tokens.

As is also conventional in electronic video poker machines, the credit meter 22 is provided to show the amount of credits that the player has accrued on the gaming machine 10—either by inserting coins, tokens, currency or tickets or from winning plays achieved by the player. Whenever the player makes a wager, the amount of the wager is decremented from the credit meter 22. Whenever the player achieves a winning play during the play of the game, the amount of the winning play is incremented on the credit meter 22.

A conventional payout hopper may also be located on the interior of the gaming machine and is used to dispense coins or tokens to the player into a payout tray (not shown) when the player wishes to collect any winning amounts the player has accrued. Other suitable and conventional payout mechanisms can be used, such as a ticket printer or other cashless payout devices.

A button panel 40 is also provided on the poker machine 10 and the buttons mounted on the button panel 40 are used by the player to control the operation of the poker machine 10. Any suitable configuration of the buttons on the button panel can be used and, alternatively, conventional touch screen technology can be used for any or all of the buttons mounted on the button panel.

A typical button arrangement is shown on the button panel 40 in FIG. 1. A "BET ONE" button 42 is provided to allow the player to wager one credit at a time. A "BET MAX" button 44 is provided to allow the player to wager the maximum amount of credits permitted by the configuration of the gaming machine 10. Any number of credits can be set as the maximum amount that it is possible to wager on each hand and, typically, five credits will be the maximum number of credits for any particular hand. Alternatively, a "BET ONE" location 26 and a "BET MAX" location 28 can be provided on the video screen 20 to allow the player to wager by using conventional touch screen technology.

The button panel 40 also includes a "CASH OUT" button 41 by which the player can effect the cashing out of any credits accrued on the credit meter 22. A touch screen "CASH OUT" location 21 may also be provided.

A conventional "DEAL/DRAW" button 46 is also provided on the button panel 40 which is used by the player to activate the initial deal of the cards at the deal stage of the method of play or the dealing of replacement cards at the draw stage of the method of play as is appropriate. Similarly, a DEAL/DRAW location 27 can be provided on the video screen 20 to allow the player to effect either the deal step or the draw step by using conventional touch screen technology.

The button panel 40 is also provided with five "CARD" buttons 48A, 48B, 48C, 48D and 48E associated with each horizontal card location on the video screen display: card button 48A is associated with the left most card location, card button 48B is associated with the second from the left card location, card button 48C is associated with the middle card location, card button 48D is associated with the second from the right card location and card button 48E is associated with the right most card location. Each card button is preferably aligned below the card locations so that the player can easily associate the appropriate card button with the appropriate card location. These card locations 48 are used by the player to select which cards to hold during the draw step of the poker game. Alternatively, the card locations on the video screen display 20 can be touch screen activated to allow the play to select which cards to hold by merely touching the card location on the video screen display 20.

A "BET ONE HAND" touch screen location 23 is provided on the video screen display 20 to allow the player to choose to play one hand of video poker. Each time the player presses the "BET ONE HAND" touch screen location 23 another hand of video poker is activated for that round of play. A "BET ALL HANDS" touch screen location 24 is also provided on the video screen display 20 to allow the play to activate all available hands of the multiple hand poker game with a single press. Associated buttons (not shown) may be provided on the button panel 40 to allow the player to bet one hand or to bet all hands.

The button panel 40 also includes a "BET MULTIPLIER" button 45 and an associated "BET MULTIPLIER" touch screen location 25 can be provided on the video screen display 20. This allows the player to activate the multiplier feature of the present invention during the play of the video poker game, if the use of the multiplier feature is optional during the play.

The video screen display 20 also has a "BET" location 32 that shows the amount of credits that have been wagered on a particular round of play and a "WIN" location 34 that shows the amount of credits won by the player on a particular round of play.

The method of the present invention will now be described. After the player has inserted an appropriate amount of coins, tokens, currency or tickets to add a sufficient amount of credits on the credit display meter 22, the player makes his initial wager. The player may press the "BET ONE" button 42 one or more times to bet in single increments or the player may merely press the "BET MAX" button 44 and the maximum number of credits are applied, for example, five credits would be wagered. The player can also use the touch screen locations to make his wager as described above.

As shown in FIG. 1, a player has made an eighteen credit wager shown in the "BET" location 32. This activates three pay lines: five credits are allocated as the amount wagered on each pay line and the sixth credit is required for the multiplier feature on each pay line. In the preferred embodiment of the present invention, a player must make an extra wager to be eligible for the multiplier feature. The amount of the extra wager relates to the frequency and amount of the multipliers applied to the various pay lines. Alternatively, no extra wager could be required for the multiplier feature, but the pay table would have to be adjusted for the increased payouts that would come from the multiplier feature.

A multiplier indicator 60 is provided on the video screen display 20. In a preferred embodiment of the present invention, an illuminating effect could randomly flash through the various multipliers show in the multiplier indicator 60 and wherever the illuminating effect stopped, that particular multiplier would be selected for an active pay line. Any other suitable multiplier random selection device could be used.

As shown in FIG. 1, a 2× multiplier 61 has been randomly selected for HAND 71, a 6× multiplier 62 has been randomly selected for HAND 72 and a 1× multiplier 63 has been randomly selected for HAND 73. The payouts for any winning card combinations that are achieved on each of these pay lines would be increased by the indicated multiplier.

The poker game shown in FIG. 1 as an example is a three hand poker game played in accordance with the method disclosed in U.S. Pat. No. 5,873,823. The player has been dealt a first HAND 71 of the Ace of Spades, Four of Hearts, Six of Clubs, Ace of Hearts and Nine of Diamonds. The player has selected to hold the Ace of Spades and the Ace of Hearts and these two cards are duplicated into second HAND 72 and third HAND 73.

Figure 2:
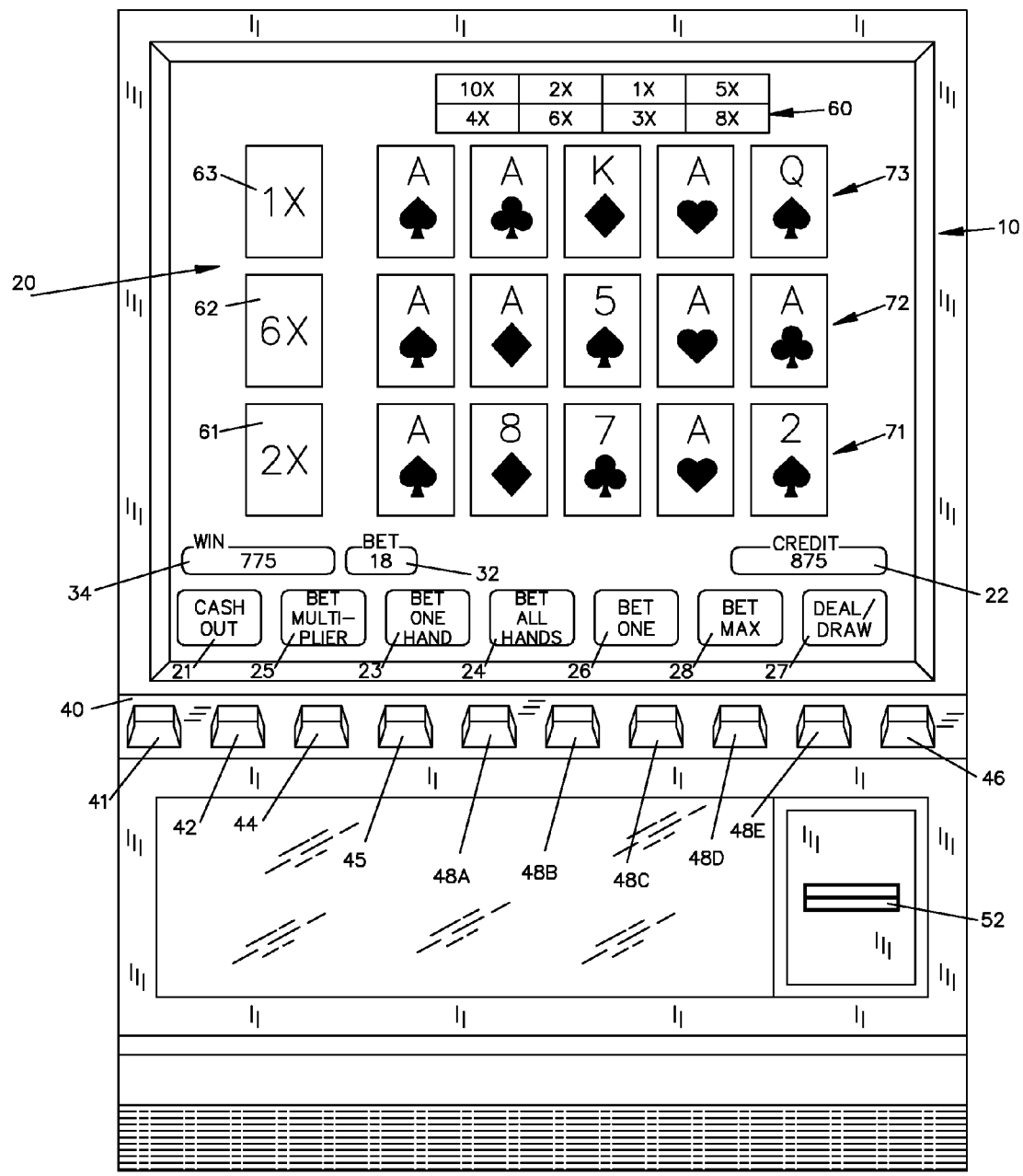
FIG. 2 shows a video poker machine configured to practice the present invention showing a representative display of the final hands of a multiple hand poker game.

As shown in FIG. 2, replacement cards for the discarded cards of first HAND 71 are displayed and the final first HAND 71 has a poker hand combination of a Pair of Aces. Additional cards are displayed into second HAND 72 and the final second HAND 72 has a poker hand combination of Four Aces. Additional cards are displayed into third HAND 73 and the final third HAND 73 has a poker hand combination of Three Aces.

In the example shown in FIGS. 1 and 2, a Jacks or Better draw poker game format is used. A suitable pay table for this format would be:

TABLE 1

| DRAW POKER | NUMBER OF COINS BET | | | | |
|---|---|---|---|---|---|
| POKER HAND | 1 | 2 | 3 | 4 | 5 |
| ROYAL FLUSH | 250 | 500 | 750 | 1000 | 4000 |
| STRAIGHT FLUSH | 50 | 100 | 150 | 200 | 250 |
| FOUR-OF-A-KIND | 25 | 50 | 75 | 100 | 125 |
| FULL HOUSE | 9 | 18 | 27 | 36 | 45 |
| FLUSH | 6 | 12 | 18 | 24 | 30 |
| STRAIGHT | 4 | 8 | 12 | 16 | 20 |
| THREE-OF-A-KIND | 3 | 6 | 9 | 12 | 15 |
| TWO PAIR | 2 | 4 | 6 | 8 | 10 |
| JACKS OR BETTER | 1 | 2 | 3 | 4 | 5 |

Using the pay table shown in Table 1, final HAND 71 is a winning combination of Jacks or Better and the player would receive ten credits as a payout based on the 2× multiplier 61. Final HAND 72 is a winning combination of Four-of-a-Kind and the player would receive seven hundred fifty credits as a payout based on the 6× multiplier 62. Final HAND 73 is a winning combination of Three-of-a-Kind and the player would receive fifteen credits as a payout based on the 1× multiplier 63.

While the example shown in FIGS. 1 and 2 uses a regular Jacks or Better draw poker format pay table, other pay tables have been developed for the other variations of draw poker, such as Deuces Wild Poker, Bonus Poker, Double Bonus Poker, Double Double Bonus Poker, Triple Bonus Poker, Joker's Wild Poker or any of the myriad of video poker formats that have been developed. Each of these video poker formats uses various arrangements of poker hand rankings as winning combinations and they use various payout amounts for the poker hand rankings. The amounts paid for the various winning hand combinations in each of the video poker formats are calculated to provide a certain theoretical game return based on the mathematical probability of achieving the winning hand combinations and the theoretical hold percentage that the casino wishes to offer to the players.

The method of the present invention can be applied to any of the various video poker formats discussed above.

Figure 3:
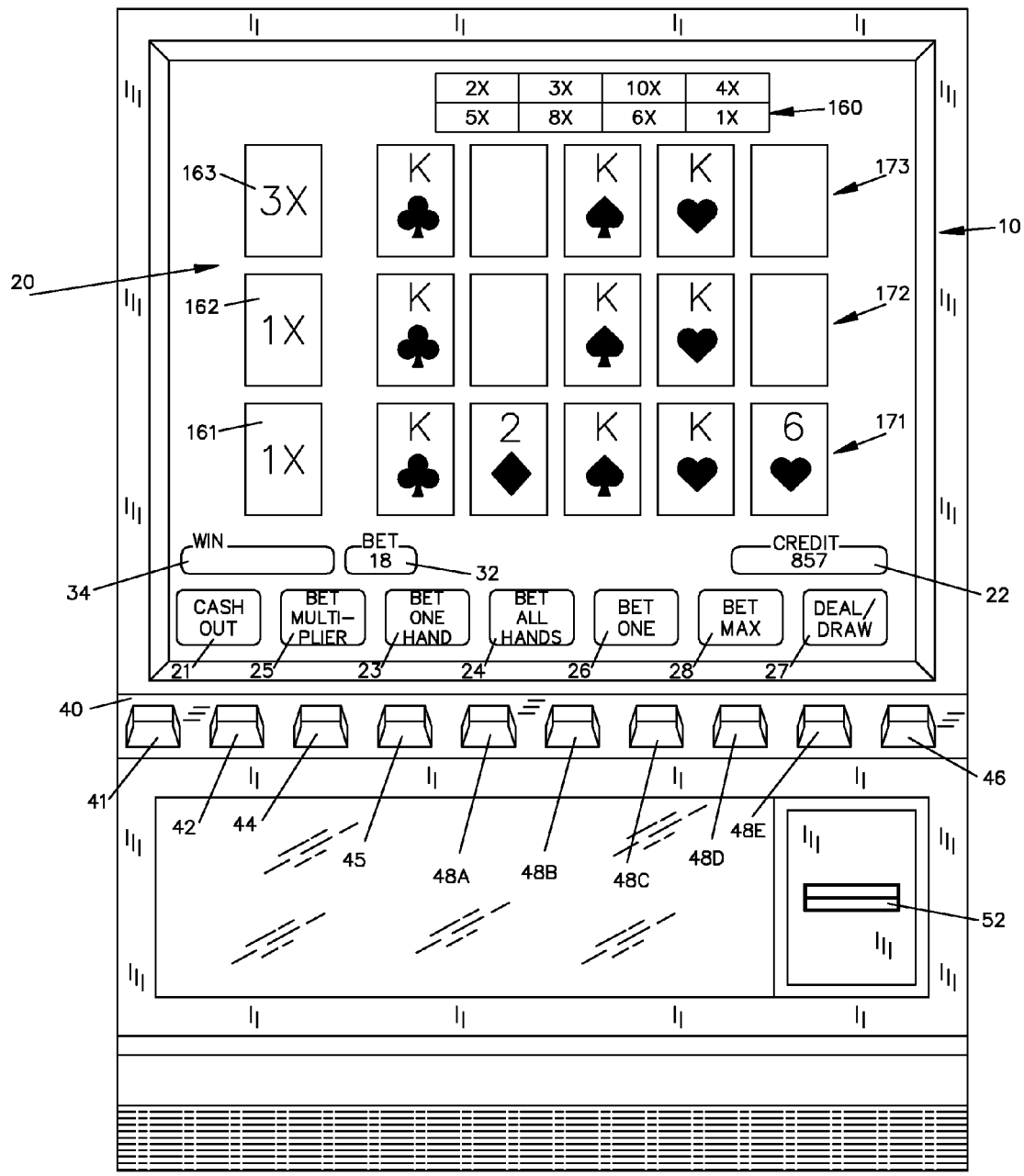
FIG. 3 shows a video poker machine configured to practice the present invention showing another representative initial deal of the cards of a multiple hand poker game.

FIG. 3 shows an example of another deal that could occur in the method of play of the present invention. The multiplier indicator 160 has a randomly rearranged order of the multipliers and a 1× multiplier 161 has been randomly selected for first HAND 171, a 1× multiplier has also been randomly selected for second HAND 172 and a 3× multiplier has been randomly selected for third HAND 173. Using the same three hand format described above, the player has been dealt three Kings in the first HAND 171 and the player has held these three Kings into the second HAND 172 and the third HAND 173. Any winning card combinations achieved after the card replacement step of the method would again have their respective payouts increased by the multiplier associated with each hand.

The present invention can be applied to any type of poker game that has multiple pay lines.

The present invention can also be applied to stud poker games and slot machine games or any other casino game that has multiple pay lines.

While the invention has been illustrated with respect to several specific embodiments thereof, these embodiments should be considered as illustrative rather than limiting. Various modifications and additions may be made and will be apparent to those skilled in the art.

What is claimed is:

1. A method of operating a gaming system, said method comprising:
   (a) causing an input device to receive a wager to activate at least two pay lines for a play of a casino game;
   (b) for each wagered-on pay line:
      (i) causing a processor to execute a plurality of instructions to randomly select a multiplier from a plurality of different multipliers, and
      (ii) causing the processor to execute the plurality of instructions to assign the randomly selected multiplier to the wagered-on pay line,
      (iii) causing the processor to execute the plurality of instructions to determine an outcome,
      (iv) causing a display device to display the determined outcome on the wagered-on pay line, and
      (v) causing the processor to execute the plurality of instructions to determine whether the outcome on the wagered-on pay line is a winning outcome; and
   (c) for each of any determined winning outcomes on each wagered-on pay line:
      (i) causing the processor to execute the plurality of instructions to determine an award associated with said determined winning outcome,
      (ii) causing the processor to execute the plurality of instructions to modify the determined award associated with said determined winning outcome, said modification being based on the randomly selected multiplier for that wagered-on pay line, and
      (iii) causing the display device to display the modified award.

2. The method of claim 1, wherein the casino game includes a poker game.

3. The method of claim 1, which includes causing the input device to receive an additional wager to be eligible for the multiplier for the play of the casino game.

4. A gaming system comprising:
   a display device;
   an input device;
   a processor; and
   a memory device which stores a plurality of instructions, which when executed by the processor, cause the processor to operate with the display device and the input device to:
      (a) receive a wager to activate at least two pay lines for a play of a casino game;

(b) for each wagered-on pay line:
   (i) randomly select a multiplier from a plurality of different multipliers,
   (ii) assign the randomly selected multiplier to the wagered-on pay line,
   (iii) determine an outcome on the wagered-on pay line,
   (iv) display the determined outcome on the wagered-on pay line, and
   (v) determine whether the outcome on the wagered-on pay line is a winning outcome; and
(c) for each of any determined winning outcomes on each wagered-on pay line:
   (i) determine an award associated with said determined winning outcome,
   (ii) modify the determined award associated with said determined winning outcome, said modification being based on the randomly selected multiplier for that wagered-on pay line, and
   (iii) display the modified award.

5. The gaming system of claim 4, wherein the casino game includes a poker game.

6. The gaming system of claim 4, wherein when executed by the processor, the plurality of instructions cause the processor to operate with the input device to receive an additional wager to be eligible for the multiplier for the play of the casino game.

\* \* \* \* \*

UNITED STATES PATENT AND TRADEMARK OFFICE
CERTIFICATE OF CORRECTION

| | | |
|---|---|---|
| PATENT NO. | : 9,017,159 B2 | Page 1 of 1 |
| APPLICATION NO. | : 13/442058 | |
| DATED | : April 28, 2015 | |
| INVENTOR(S) | : Ernest W. Moody | |

It is certified that error appears in the above-identified patent and that said Letters Patent is hereby corrected as shown below:

IN THE CLAIMS

In Claim 1, Column 6, Line 30, delete "and".

Signed and Sealed this
Twenty-sixth Day of July, 2016

Michelle K. Lee
*Director of the United States Patent and Trademark Office*